(12) United States Patent
Jang (10) Patent No.: US 9,904,396 B2
(45) Date of Patent: Feb. 27, 2018

(54) FLEXIBLE DISPLAY DEVICE HAVING TOUCH AND BENDING SENSING FUNCTION

(71) Applicant: SAMSUNG DISPLAY CO., LTD., Yongin-si, Gyeonggi-do (KR)

(72) Inventor: Hyoung-Wook Jang, Yongin-si (KR)

(73) Assignee: SAMSUNG DISPLAY CO., LTD., Yongin, Gyunggi-do (KR)

( * ) Notice: Subject to any disclaimer, the term of this patent is extended or adjusted under 35 U.S.C. 154(b) by 0 days.

(21) Appl. No.: 15/089,047

(22) Filed: Apr. 1, 2016

(65) Prior Publication Data

US 2016/0216822 A1    Jul. 28, 2016

Related U.S. Application Data (62) Division of application No. 13/927,377, filed on Jun. 26, 2013, now Pat. No. 9,304,348.

(30) Foreign Application Priority Data

Jan. 24, 2013    (KR) .................. 10-2013-0008054

(51) Int. Cl.
```
G09G 3/30      (2006.01)
G06F 3/041     (2006.01)
G02F 1/1333    (2006.01)
G06F 3/044     (2006.01)
```
(52) U.S. Cl.
CPC ........ G06F 3/0414 (2013.01); G02F 1/13338 (2013.01); G06F 3/044 (2013.01); G06F 3/0412 (2013.01); *G06F 2203/04102* (2013.01); *G06F 2203/04105* (2013.01); *G06F 2203/04106* (2013.01)

(58) Field of Classification Search
CPC ........ G06F 3/0414; G06F 2203/04102; G06F 3/044; G06F 3/0412; G06F 2203/04105; G06F 2203/04106; G02F 1/13338
USPC .................................................... 345/76, 173
See application file for complete search history.

(56) References Cited

U.S. PATENT DOCUMENTS

| | | |
|---|---|---|
| 6,002,389 A | 12/1999 | Kasser |
| 2003/0085882 A1 | 5/2003 | Lu |
| 2003/0227441 A1 | 12/2003 | Hioki et al. |
| 2004/0008191 A1 | 1/2004 | Poupyrev et al. |
| 2009/0256817 A1 | 10/2009 | Perlin et al. |

(Continued)

FOREIGN PATENT DOCUMENTS

| | | |
|---|---|---|
| EP | 2 447 812 A2 | 5/2012 |
| KR | 10-2009-0076126 A | 7/2009 |

(Continued)

OTHER PUBLICATIONS

Extended European Search Report dated Jul. 25, 2016 in Corresponding European Patent Application No. 13179463.8.

*Primary Examiner* — Jennifer Nguyen
(74) *Attorney, Agent, or Firm* — Lee & Morse, P.C.

(57) ABSTRACT

A flexible display device having a touch and bending sensing function includes a plurality of pixels on a display area of a first substrate, and a pressure sensor portion between the first substrate and the plurality of pixels, the pressure sensor portion including a plurality of first electrodes arranged in a first direction and a plurality of second electrodes above the first electrodes and arranged in a second direction.

14 Claims, 6 Drawing Sheets

(56) References Cited

U.S. PATENT DOCUMENTS

| | | | |
|---|---|---|---|
| 2010/0013745 A1* | 1/2010 | Kim | G06F 3/0412 |
| | | | 345/76 |
| 2010/0033447 A1 | 2/2010 | Horie | |
| 2010/0164888 A1 | 7/2010 | Okumura et al. | |
| 2010/0231530 A1 | 9/2010 | Lin et al. | |
| 2011/0050586 A1 | 3/2011 | Miller et al. | |
| 2011/0227862 A1 | 9/2011 | Lim | |
| 2012/0038583 A1 | 2/2012 | Westhues et al. | |
| 2012/0092363 A1* | 4/2012 | Kim | G06T 5/006 |
| | | | 345/618 |
| 2012/0105344 A1 | 5/2012 | Ko et al. | |
| 2012/0212445 A1 | 8/2012 | Heikkinen et al. | |
| 2012/0242610 A1 | 9/2012 | Yasumatsu | |
| 2012/0256720 A1 | 10/2012 | Byun et al. | |
| 2013/0021268 A1* | 1/2013 | Lee | G06F 3/0416 |
| | | | 345/173 |
| 2013/0083496 A1 | 4/2013 | Franklin et al. | |
| 2013/0096849 A1* | 4/2013 | Campbell | G06F 3/0414 |
| | | | 702/42 |
| 2014/0015743 A1 | 1/2014 | Seo et al. | |
| 2014/0042398 A1* | 2/2014 | Choi | H01L 27/3244 |
| | | | 257/40 |
| 2014/0098028 A1 | 4/2014 | Kwak et al. | |

FOREIGN PATENT DOCUMENTS

| | | |
|---|---|---|
| KR | 10-2009-0087303 A | 8/2009 |
| KR | 10 2011-0106116 A | 9/2011 |
| KR | 10 2012-0058540 A | 6/2012 |
| KR | 10 2012-0073140 A | 7/2012 |
| WO | WO 2004/053576 A1 | 6/2004 |

\* cited by examiner

FLEXIBLE DISPLAY DEVICE HAVING TOUCH AND BENDING SENSING FUNCTION

CROSS REFERENCE TO RELATED APPLICATIONS

This is a divisional application based on pending application Ser. No. 13/927,377, filed Jun. 26, 2013, the entire contents of which is hereby incorporated by reference.

This application claims priority to and the benefit of Korean Patent Application No. 10-2013-0008054, filed on Jan. 24, 2013, in the Korean Intellectual Property Office, the entire content of which is incorporated herein by reference.

BACKGROUND

1. Field

Example embodiments relate to a display device, and more particularly, to a flexible display device capable of sensing a touch and sensing a bending state thereof.

2. Description of the Related Art

Touch screen panels are currently used as input means of a smart phone, a smart pad and the like, which are widely used. A touch screen panel is an input device that allows a user's instruction to be input by selecting an instruction content displayed on a screen of a display device or the like with a user's hand or object.

To this end, the touch screen panel is formed on a front face of the display device to convert a contact position into an electrical signal. Here, the user's hand or object is directly in contact with the touch screen panel at the contact position. Accordingly, the instruction content selected at the contact position is input as an input signal to the image display device. Since such a touch screen panel can be substituted for a separate input device connected to a display device, e.g., a keyboard or mouse, its application fields have been gradually extended.

Touch screen panels may be divided into a resistive overlay touch screen panel, a photosensitive touch screen panel, a capacitive touch screen panel, and the like. Among these touch screen panels, the capacitive touch screen panel converts a contact position into an electrical signal by sensing a change in capacitance formed between a conductive sensing electrode and an adjacent sensing electrode or ground electrode when a user's hand or object comes in contact with the touch screen panel.

SUMMARY

Embodiments provide a flexible display device in which a pressure sensor portion sensing a touch position through pressure transferred in touch contact is formed on one surface of a substrate of the flexible display device, so that it is possible to minimize the thickness of the display device and to perform touch recognition for a touch except contact with the skin of a finger.

Embodiments also provide a flexible display device in which at least one electrode of the pressure sensor portion is implemented as a strain pattern, so that it is possible to sense a bending state of the flexible display device.

Embodiments also provide a flexible display device in which the pressure sensor portion and the display device are connected to one flexible printed circuit board, so that it is possible to simplify a manufacturing process of the display device and to reduce production cost.

Embodiments also provide a flexible display device in which an upper substrate of the display device is used as a substrate of a touch screen panel, so that it is possible to improve visibility of images while minimizing the thickness of the display device, and to perform more detailed touch recognition.

According to an aspect of the present invention, there is provided a flexible display device having a touch and bending sensing function and including a plurality of pixels on a display area of a first substrate, and a pressure sensor portion between the first substrate and the plurality of pixels, the pressure sensor portion including a plurality of first electrodes arranged in a first direction and a plurality of second electrodes above the first electrodes and arranged in a second direction.

The pressure sensor portion may include a plurality of first electrodes arranged in the first direction by being patterned on the one surface of the first substrate; an insulation layer formed on the entire surface of the first substrate including the first electrodes; a plurality of second electrodes formed on the insulation layer and arranged in the second direction intersecting with the first electrodes; and a buffer layer formed on the second electrodes so as to planarize the surface of the first substrate, wherein the pressure sensor portion is implemented into a structure in which the plurality of first electrodes, the insulation layer and the buffer layer are sequentially stacked.

Spacers maintaining the interval between the first and second electrodes may be included in the insulation layer. The insulation layer may be made of a pressure conductivity changeable material.

The plurality of pixels may be formed on the buffer layer.

Some of the plurality of first and second electrodes may be implemented as strain sensors. The strain sensors may be formed as bending patterns.

The first substrate may be made of a transparent material having flexibility. The material having the flexibility may be polyimide.

According to another aspect of the present invention, there is provided a flexible display device having a touch and bending sensing function, including: a plurality of pixels formed on a display area of a first substrate; signal lines arranged on a non-display area positioned at the outside of the display area so as to be connected to the plurality of pixels; a pressure sensor portion including a plurality of first electrodes positioned between an upper surface of the first substrate and a lower surface of the plurality of pixels and arranged in a first direction, and a second electrodes positioned above the first electrodes and arranged in a second direction; a driving pad portion provided at one end of the non-display area so as to be electrically connected to the signal lines; and a pressure sensor pad portion positioned adjacent to the driving pad portion on the same plane and including a pressure sensor pad portion electrically connected to the pressure sensor portion.

The driving pad portion and the pressure sensor pad portion may be electrically connected to the same flexible printed circuit board.

The flexible display device may further include first and second lines respectively connected to ends of the first and second electrodes. The first and second lines connected to the first and second electrodes are electrically connected to pads of the pressure sensor pad portion through contact holes formed in the first substrate, respectively.

According to still another aspect of the present invention, there is provided a flexible display device having a touch and bending sensing function, including: a plurality of pixels formed on a display area of a first substrate; signal lines arranged on a non-display area positioned at the outside of the display area so as to be connected to the plurality of pixels; a pressure sensor portion including a plurality of first electrodes positioned between an upper surface of the first substrate and a lower surface of the plurality of pixels and arranged in a first direction, and a second electrodes positioned above the first electrodes and arranged in a second direction; a second substrate positioned on the first substrate so as to seal the first substrate, and divided into a display area and a non-display area positioned at the outside of the display area; a plurality of sensing patterns formed on the display area of the second substrate; a plurality of sensing lines formed on the non-display area of the second substrate and connected to the respective sensing patterns; and a sealing material formed at an edge of the non-display area so as to bond together the first and second substrates.

The flexible display device may further include a first touch pad portion provided on the non-display area of the second substrate overlapping with the sealing material so as to be electrically connected to the plurality of sensing lines.

The flexible display device may further include a driving pad portion provided at one end of the non-display area of the first substrate so as to be electrically connected to the signal lines; a pressure sensor pad portion positioned adjacent to the driving pad portion on the same plane and electrically connected to the pressure sensor portion; and a second touch pad portion positioned adjacent to the driving pad portion on the same plane and electrically connected to the first touch pad portion.

A plurality of pads constituting the first touch pad portion may be electrically connected to pads of the second touch pad portion through a plurality of conductive media provided in the sealing material, respectively.

The driving pad portion, the pressure sensor pad portion and the second touch pad portion may be electrically connected to the same flexible printed circuit board.

BRIEF DESCRIPTION OF THE DRAWINGS

The accompanying drawings, together with the specification, illustrate exemplary embodiments, and, together with the description, serve to explain the principles of the inventive concept.

DETAILED DESCRIPTION

Korean Patent Application No. 10-2013-0008054, filed on Jan. 24, 2013, in the Korean Intellectual Property Office, and entitled: "flexible display device having touch and bending sensing function" is incorporated by reference herein in its entirety.

In the following detailed description, only certain exemplary embodiments have been shown and described, simply by way of illustration. As those skilled in the art would realize, the described embodiments may be modified in various different ways, all without departing from the spirit or scope of the inventive concept. Accordingly, the drawings and description are to be regarded as illustrative in nature and not restrictive.

In addition, when an element is referred to as being "on" another element, it can be directly on the other element or be indirectly on the other element with one or more intervening elements interposed therebetween. Also, when an element is referred to as being "connected to" another element, it can be directly connected to the other element or can be indirectly connected to the other element with one or more intervening elements interposed therebetween. Hereinafter, like reference numerals refer to like elements throughout.

Figure 1:
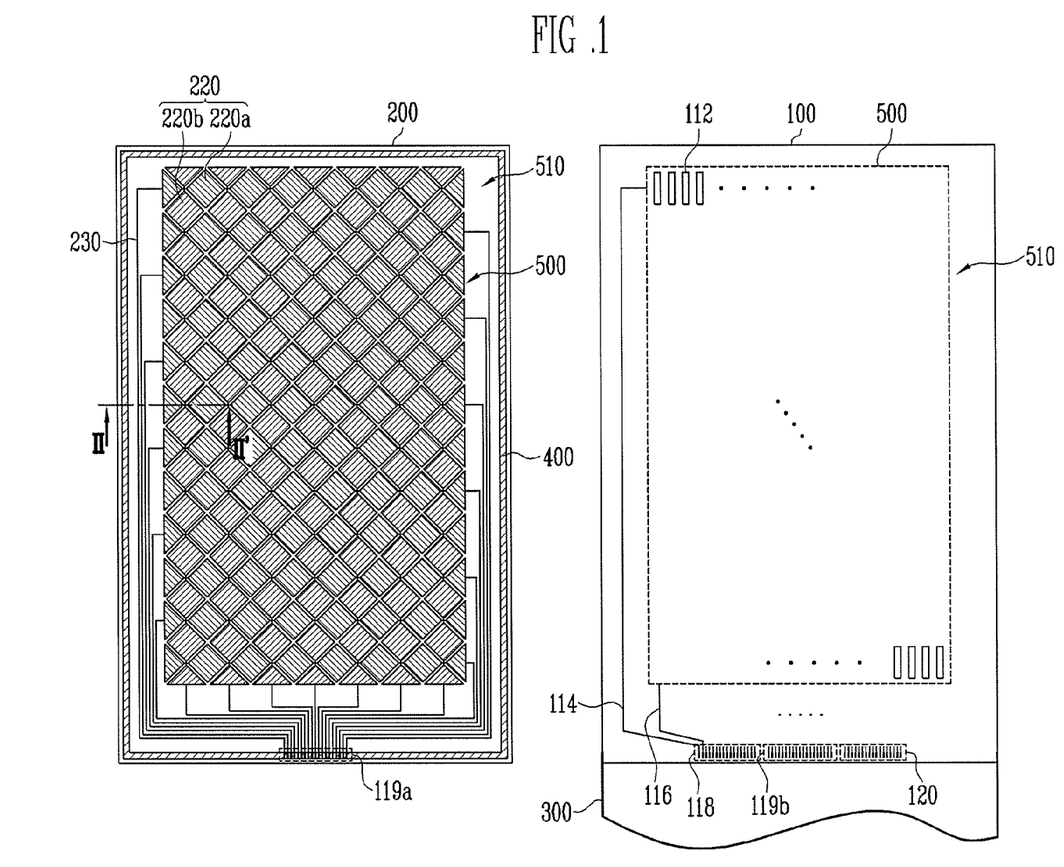
FIG. 1 is a separate plan view of a flexible display device according to an embodiment.
Figure 2A:
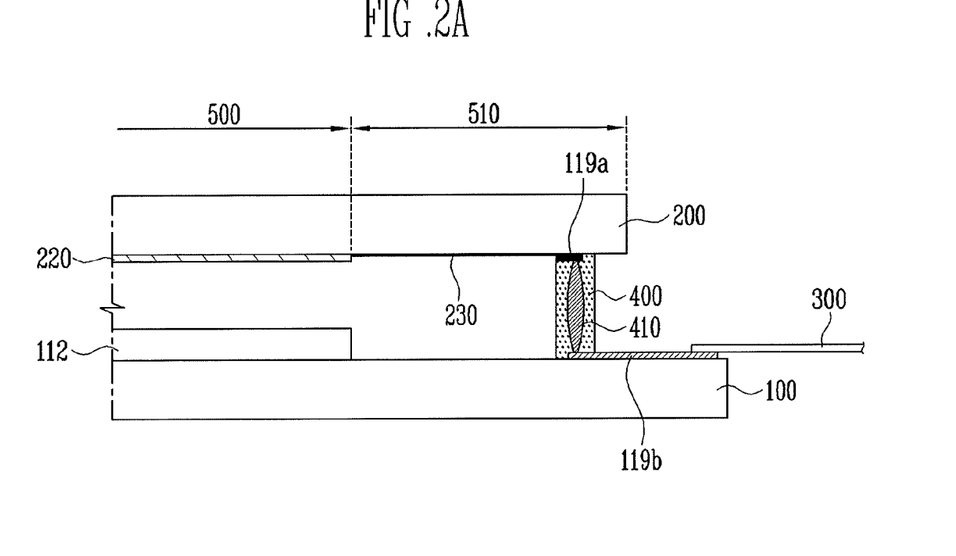
FIGS. 2A and 2B are sectional views illustrating forms of connection between pad portions shown in FIG. 1.
Figure 2B:
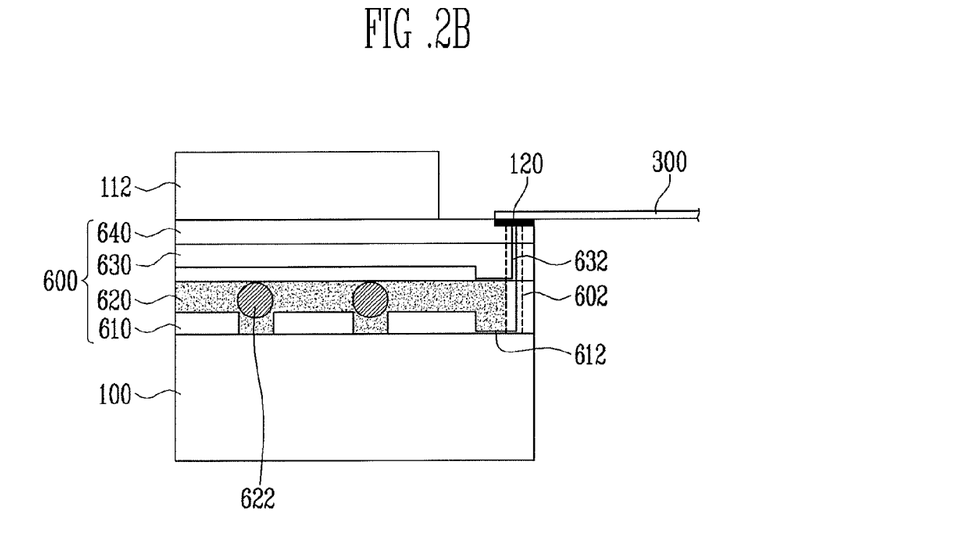

FIG. 1 is a separate plan view of a flexible display device according to an embodiment. FIGS. 2A and 2B are sectional views illustrating forms of connection between pad portions shown in FIG. 1. It is noted that while FIG. 1 illustrates a flexible organic light emitting display device with integrated touch screen panel and pressure sensor portion are integrated, embodiments are not necessarily limited thereto, e.g., the flexible display device according to embodiment may be implemented so that only the pressure sensor portion is provided on one surface of a lower substrate of the display device.

Referring to FIG. 1, sensing patterns and sensing lines for implementing the touch screen panel are, e.g., directly, formed on one surface of an upper substrate 200 of the organic light emitting display device, and first and second electrodes for implementing the pressure sensor portion are, e.g., directly, formed on one surface of a lower substrate 100 of the organic light emitting display device.

In this case, the upper substrate 200 performs the function of a sealing substrate of the organic light emitting display device, and may be made of a material having flexibility. The one surface of the upper substrate 200 may become an inner surface of the upper substrate. Accordingly, the one surface of the upper substrate 200 shown in FIG. 1 corresponds to the inner surface of the upper substrate. However, this is merely one embodiment and example embodiments are not limited thereto, e.g., sensing patterns 220 of the touch screen panel may be formed on an outer surface of the upper substrate 200, or may be formed on each of the inner and outer surfaces of the upper substrate 200.

In an embodiment, the pressure sensor portion is formed on the lower substrate 100. The pressure sensor portion performs a function of sensing a touch position through pressure transferred in a touch contact, even when an object other than a finger contacts the touch screen panel. To this end, the pressure sensor portion includes first and second electrodes arranged to intersect each other in different layers, and spacers maintaining the interval between the first and second electrodes. The configuration of an embodiment will be described in detail with reference to FIG. 1.

Referring to FIG. 1, the sensing patterns 220 of the touch screen panel and sensing lines 230 connecting the sensing patterns 220 to an external touch IC (not shown) through a first touch pad portion 119a are formed on one surface of the upper substrate 200. The upper substrate 200 seals the lower substrate 100 with respect to a plurality of pixels 112 formed on a display area 500 of the lower substrate 100, and the pressure sensor portion (not shown), including first and second electrodes arranged to intersect each other in different layers and spacers maintaining the interval between the first and second electrodes, is formed on one surface of the lower substrate 100 having the plurality of pixels 112 formed thereon. That is, the pressure sensor portion may be, e.g., directly, formed on the one surface of the lower substrate 100. The plurality of pixels 112 is formed on an area overlapping the pressure sensor portion.

The sensing patterns 220 are formed on the display area 500 of the upper substrate 200, and the sensing lines 230 are formed on a non-display area 510 positioned outside of the display area 500. A sealing material 400 for bonding the upper and lower substrates 200 and 100 is coated at an edge of the non-display area 510.

A plurality of signal lines 114 and 116, i.e., scan lines 114 and data lines 116, are connected to the respective pixels 112 formed on the display area 500 of the lower substrate 100. The signal lines 114 and 116 are arranged on the non-display area 510.

The scan lines 114 and the data lines 116 may be arranged as shown in FIG. 1. However, emission control lines for controlling emission of organic light emitting diodes provided to the respective pixels and the like may be further provided in addition to the signal lines 114 and 116. In this case, each pixel may be configured to include an organic light emitting diode that is a self-luminescent element, a plurality of transistors and at least one capacitor. The signal lines 114 and 116, as shown in FIG. 1, are connected to a driving pad portion 118 provided at one end of the non-display area 510 of the lower substrate 100, and a signal may be received from an external driving IC (not shown) mounted on a flexible printed circuit board (FPCB) 300 through the signal lines 114 and 116.

A second touch pad portion 119b and a pressure sensor pad portion 120 are provided adjacent to a side of the driving pad portion 118. The pressure sensor portion is electrically connected to the pressure sensor pad portion 120, and the first touch pad portion 119a formed on the upper substrate 200 is electrically connected to the second touch pad portion 119b. In this case, the form of connection between the first touch pad portion 119a formed on the upper substrate 200 and the second touch pad portion 119b formed on the lower substrate 100 may be implemented as shown in FIG. 2A.

That is, referring to FIG. 2A, the first touch pad portion 119a of the upper substrate 200 is formed at a position overlapping the sealing material 400. The second touch pad portion 119b is provided at an end, e.g., edge, of the non-display area 510 of the lower substrate 100, and overlaps the sealing material 400. A plurality of pads constituting the first touch pad portion 119a are electrically connected to a plurality of pads of the second touch pad portion 119b through a plurality of conductive media, e.g., conductive balls 410, in the sealing material 400.

It is noted that FIG. 2A illustrates the pixels 112 on the lower substrate 100 only for convenience of illustration of the connection between the first and second touch pad portions 119a and 119b. According to example embodiments, a pressure sensor portion 600 is formed between the pixels 112 and the lower substrate 100, as illustrated in FIG. 2B.

That is, as illustrated in FIG. 2B, the pressure sensor portion 600 may be directly formed on one surface of the lower substrate 100. For example, the pressure sensor portion 600 may continuously overlap the entire display area 500 on the lower substrate 100, e.g., overlap all the pixels 112. The pressure sensor portion 600 may include a stacked structure between, e.g., directly between, the lower substrate 100 and the pixels 112. In detail, the pressure sensor portion 600 may include first electrodes 610, an insulation layer 620, second electrodes 630, and a buffer layer 640 stacked on, e.g., directly on, the lower substrate 100.

In further detail, as illustrated in FIG. 2B, the pressure sensor portion 600 may include a plurality of first lines 612 connected to the first electrodes 610, and a plurality of second lines 632 connected to the second electrodes 630. The first and second electrodes 610 and 630 intersect each other. The first electrodes 610 are electrically connected to pads of the pressure sensor pad portion 120 through contact holes 602, while the pressure sensor pad portion 120 is provided at the one end of the non-display area 510 of the lower substrate 100, e.g., the lower substrate 100 may be formed of a polyimide material having flexibility.

The pressure sensor portion 600 is implemented into a structure including the plurality of first electrodes 610 arranged in a first direction by being directly patterned on the one surface of the lower substrate 100. The insulating layer 620 is formed on the entire surface of the lower substrate 100 including the first electrodes 610, and the second electrodes 630 are formed on the insulation layer 620 and arranged in the direction intersecting the first electrodes 610. The buffer layer 640 is formed on the second electrodes 630 so as to planarize the surface of the lower substrate 100. Elements 610, 620, 630, and 640 are sequentially stacked on top of the lower substrate 100, and the plurality of pixels 112 are formed on the buffer layer 640.

Figure 3A:
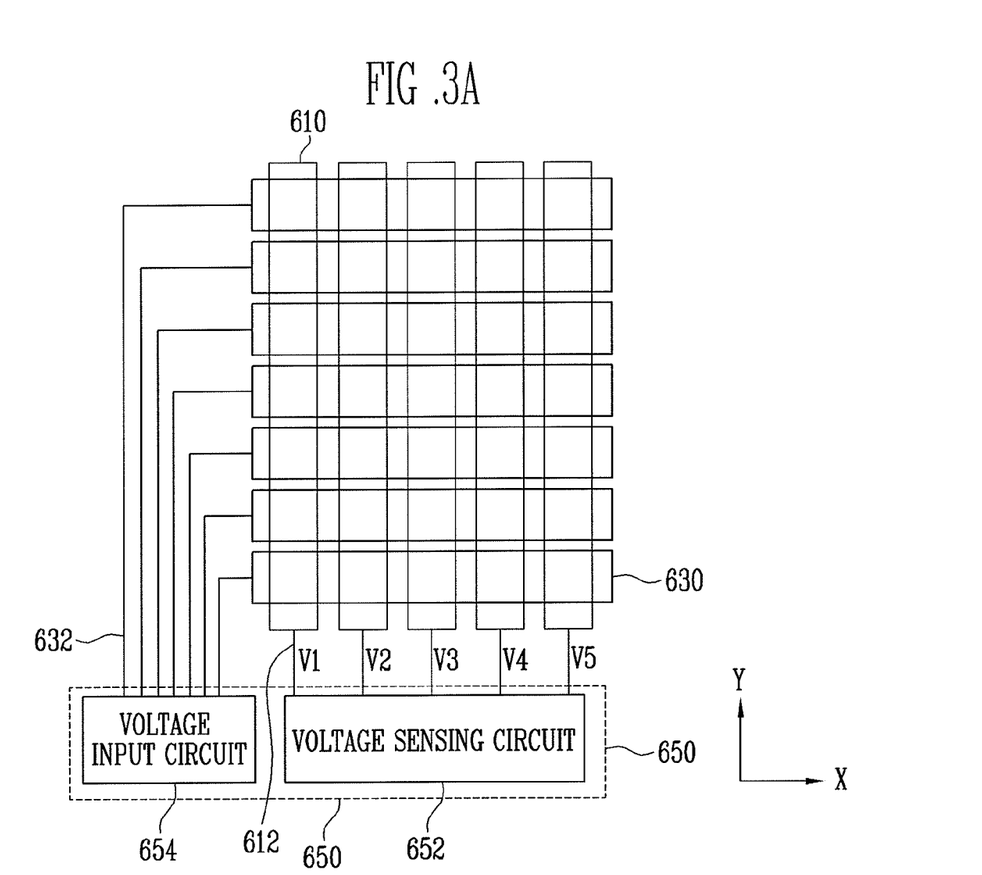
FIGS. 3A and 3B are plan views schematically illustrating configurations of a pressure sensor portion according to embodiments.
Figure 3B:
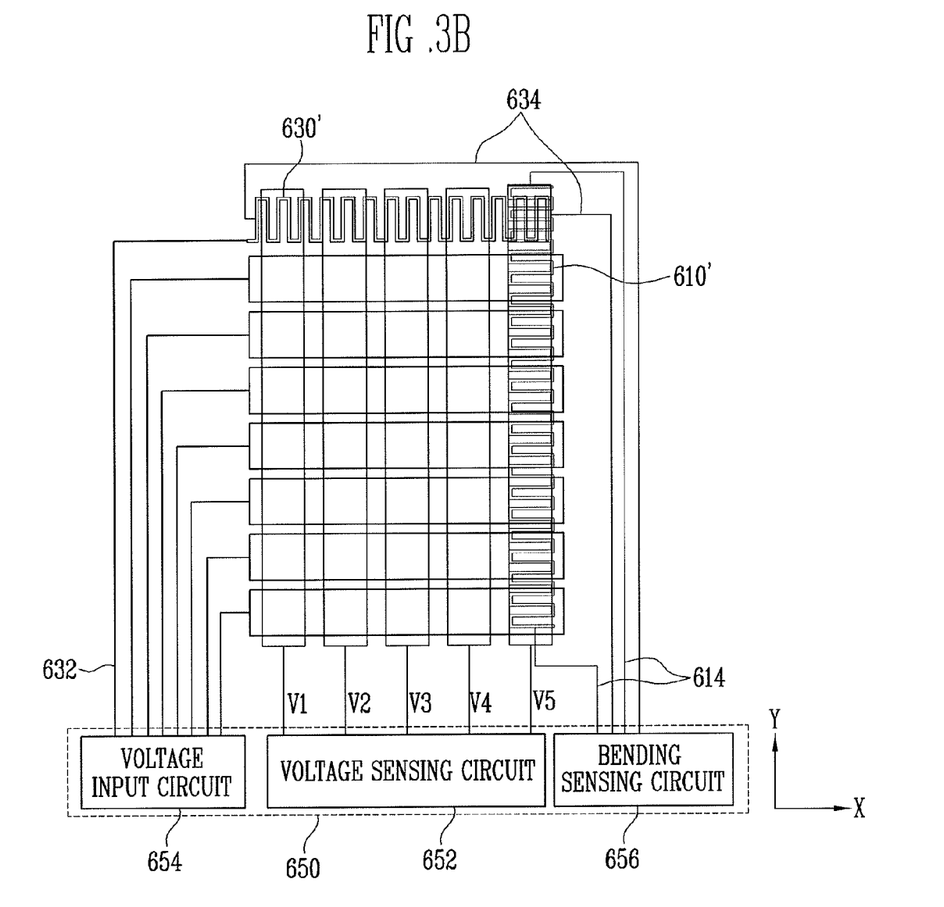

Spacers 622 maintaining an interval between the first and second electrodes 610 and 630 are included in the insulation layer 620, and the insulation layer 620 may be made of a pressure conductivity changeable material. The configuration and operation of the pressure sensor portion 600 will be described in detail with reference to FIGS. 3 and 4.

The pad portions provided at the one end of the non-display area 510 of the lower substrate 100 described above, i.e., the driving pad portion 118, the second touch pad portion 119b and the pressure sensor pad portion 120, are electrically connected to a same FPCB 300, as shown in FIGS. 2A and 2B. A driving IC (not shown) driving the plurality of pixels 112 provided on the display area 500 of the lower substrate 100, a touch IC (not shown) controlling operations of the sensing patterns 220 provided on the upper substrate 200, and a pressure sensor IC (not shown) controlling an operation of the pressure sensor portion 600 formed on the one surface of the lower substrate 100 are mounted on the FPCB 300. In this case, the driving IC, the touch IC, and the pressure sensor IC may be implemented as separate ICs, or may be implemented as one integrated IC performing all functions of the ICs.

That is, in the present embodiment, the ICs mounted on the FPCB 300 are integrated as one IC, so that it is possible to simplify a bonding and testing process of the FPCB 300. Accordingly, it is possible to facilitate the manufacturing of the display device and to minimize production cost. Further, in the present embodiment, the pressure sensor portion 600 is directly formed on the one surface of the lower substrate 100 of the display device, as described above.

Figure 4:
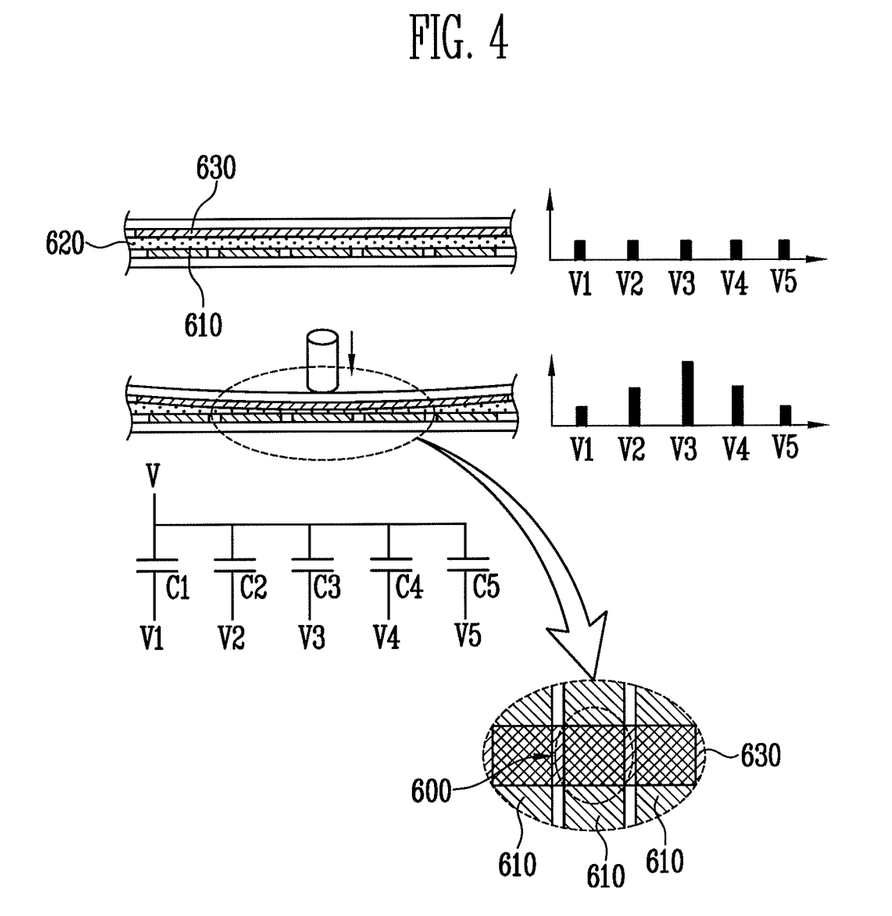
FIG. 4 is a view schematically illustrating an operation of the pressure sensor portion according to an embodiment.

FIGS. 3A and 3B are plan views schematically illustrating configurations of the pressure sensor portion 600 according to embodiments. FIG. 4 is a view schematically illustrating an operation of the pressure sensor portion 600 according to an embodiment.

First, referring to FIG. 3A, the first electrodes 610 of the pressure sensor portion 600 are arranged in a first direction (e.g., a Y-axis direction). Each first electrode 610 is electrically connected to a voltage sensing circuit 652 through a first line 612 connected to an end thereof.

Second electrodes 630 of the pressure sensor portion 600 are arranged in a second direction (e.g., an X-axis direction) intersecting the first electrodes 610. Each second electrode 630 is electrically connected to a voltage input circuit 654 through a second line 632 connected to an end thereof.

For example, the first electrodes 610 and the first lines 612 are directly patterned on the lower substrate 100 (FIG. 2B), e.g., on a flexible substrate, and the second electrodes 630 and the second lines 632 are formed on the insulation layer 620 formed on the entire surface of the lower substrate 100 including the first electrodes 610. Spacers made of an elastic material are provided in the insulation layer 620.

The voltage sensing circuit 652 and the voltage input circuit 654 are integrated on one pressure sensor IC 650. As described with reference to FIG. 2B, the pressure sensor IC 650 is mounted on the FPCB 300, which is bonded together with the pressure sensor pad portion 120. That is, the first electrodes 610 are electrically connected to the pressure sensor IC 650 via the first lines 612 and the pressure sensor pad portion 120, and the second electrodes 630 are electrically connected to the pressure sensor IC 650 via the second lines 632 and the pressure sensor pad portion 120.

In the pressure sensor portion 600 configured as described above, when a predetermined area is touched in the second electrodes 630, each having a predetermined voltage V applied thereto, and in the first electrodes 610 positioned on the area intersecting the second electrodes 630, as shown in FIG. 4, an interval between the two upper and lower electrodes is changed by the pressure at the touched area. In other words, when an object contacts an intersection area of the first and second electrodes 610 and 630, a distance between the first and second electrodes 610 and 630 decreases, i.e., a thickness of the insulation layer 620 in the contact area between the first and second electrodes 610 and 630 is compressed. Accordingly, as illustrated in FIG. 4, capacitances C1 to C5 in the touched area are changed in accordance with the varied distances between the two electrodes. The changed capacitance changes respective voltages V1 to V5 output to the second electrodes 630. For example, as illustrated in FIG. 4, voltage V3 at the contact position, i.e., at the illustrated third first electrode 610, is increased (lower graph) as compared to voltage V3 before the contact (upper graph), and is higher than voltages V2 and V4, i.e., voltages at directly adjacent electrodes that are slightly increased, and is higher than voltages V1 and V5 that are unchanged or almost unchanged. As such, the pressure sensor portion 600 recognizes the changes in the output voltages, thereby sensing a touch position, e.g., based on highest voltage.

In a case when the flexible display device is bent, a change in pressure occurs at an intersection area of the first and second electrodes corresponding to the bent area. Thus, the pressure sensor portion 600 can also sense a bending state, e.g., a bending direction, as will be described with reference to FIG. 3B.

In another embodiment, as shown in FIG. 3B, some of the first and second electrodes are implemented as strain sensors. Other components in the embodiment shown in FIG. 3B are identical to those described previously with reference to FIG. 3A. Therefore, like components are designated by like reference numerals, and their detailed descriptions will not be repeated.

Referring to FIG. 3B, at last one of the first electrodes 610, e.g., a first electrode 610' disposed at the rightmost side, is formed as a strain pattern, i.e., a bending pattern as shown in FIG. 3B. The first electrode 610', i.e., strain pattern 610', implemented as the strain pattern is connected to the voltage sensing circuit 652 through the first line 612. In addition, the first electrode 610' is connected to a bending sensing circuit 656 through a third line 614 connected to both ends of the strain pattern 610'.

Similarly, at least one of the second electrodes 630, e.g., a second electrode 630' disposed at the uppermost side, is formed as a strain pattern, i.e., a bending pattern as shown in FIG. 3B. The second electrode 630' implemented as the strain pattern is connected to the voltage sensing circuit 652 through the second line 632. In addition, the second electrode 630' is connected to the bending sensing circuit 656 through a fourth line 634 connected to both ends of the strain pattern 630'.

The pressure sensor portion configured as described above in FIG. 3B can perform touch position sensing in the same manner as the structure of FIG. 3A. In addition, the pressure sensor portion can sense a bending direction of the flexible display device.

In a case when the flexible display device is bent in the structure of FIG. 3A, a change in pressure at the intersection area of the first and second electrodes, corresponding to the bent area, is sensed, and thus the bending state can be detected. However, it may be harder to sense the bending direction of the flexible display device. For example, in a case when the flexible display device is bent inwardly or outwardly, changes in pressure at the intersection area are identical to one another, and therefore, the bending direction of the flexible display device cannot be sensed.

However, if some electrodes are implemented as strain sensors, i.e., as in the structure shown in FIG. 3B, the difference in resistance between the strain sensors occurs when the flexible display device is bent inwardly, and the difference in resistance between the strain sensors occurs when the flexible display device is bent outwardly, thereby sensing a bending direction of the flexible display device.

More specifically, the first electrode 610' implemented as the strain pattern will be described as an example. In a case when the flexible display device is bent outwardly, the length of the strain pattern is lengthened when the flexible display device is stretched during bending, e.g., elongated. Thus, the resistance of the strain pattern, i.e., of the first electrode 610', is increased, i.e., as compared with the resistance of the first electrode 610' when the flexible display device is bent inwardly or when the flexible display device is not bent. That is, the bending sensing circuit 656 recognizes a change in the resistance of the strain pattern, thereby sensing the bending direction of the flexible display device.

Like the voltage sensing circuit 652 and the voltage input circuit 654, the bending sensing circuit 656 is integrated on the one pressure sensor IC 650. As described with reference to FIG. 2B, the pressure sensor IC 650 is mounted on the FPCB 300, which is bonded together with the pressure sensor pad portion 120. In this embodiment, the touch screen panel can be directly formed on the one surface of the upper substrate of the display device as described above.

Figure 5:
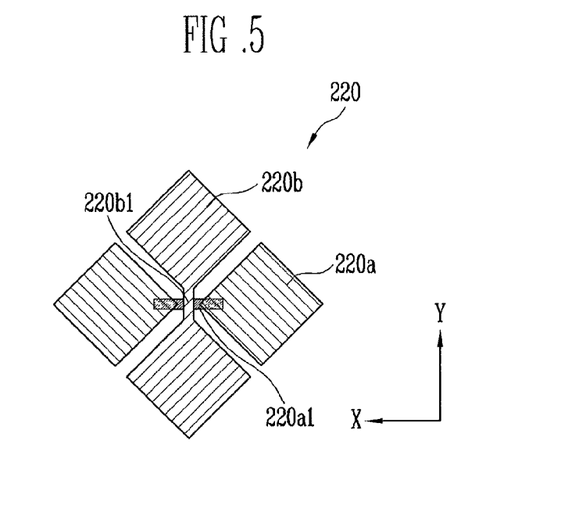
FIG. 5 is an enlarged view of a main part of a sensing pattern shown in FIG. 1.
Figure 6:
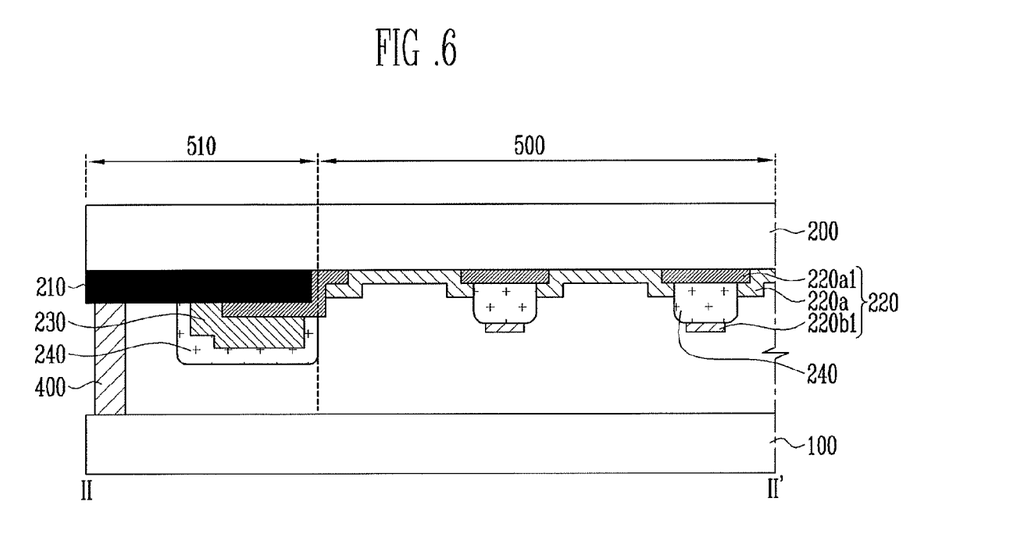
FIG. 6 is a sectional view taken along line II-II' of FIG. 1.

FIG. 5 is a partial enlarged view of a sensing pattern shown in FIG. 1. FIG. 6 is a sectional view taken along line II-II' in FIG. 1. The structure of the touch screen panel according to this embodiment will be described in detail with reference to FIGS. 1, 5, and 6.

The sensing patterns 220, as shown in FIG. 5, include a plurality of first sensing cells 220a formed to be connected in each row line along a first direction (X-axis direction), a plurality of first connecting lines 220a1 connecting the first sensing cells 220a along the first direction, a plurality of second sensing cells 220b formed to be connected in each column line along a second direction (Y-axis direction), and a plurality of second connecting lines 220b1 connecting the second sensing cells 220b along the second direction. The first sensing cells 220a and the second sensing cells 220b are alternately arranged so as not to overlap with each other, and the first connecting lines 220a1 and the second connecting lines 220b1 intersect each other. In this case, an insulation layer (not shown) for securing stability is interposed between the first connecting lines 220a1 and the second connecting lines 220b1.

Meanwhile, the first sensing cells 220a may be integrally formed with the first connecting lines 220a1 using a transparent conductive material, e.g., indium tin oxide (hereinafter, referred to as ITO), or may be formed separately from the first connecting lines 220a1, so that the first sensing cells 220a and the first connecting lines 220a1 are electrically connected to each other. The second sensing cells 220b may be integrally formed with the second connecting lines 220b1 using a transparent conductive material, e.g., ITO, or may be formed separately from the second connecting lines 220b1, so that the second sensing cells 220b and the second connecting lines 220b1 are electrically connected to each other.

For example, the second sensing cells 220b may be integrally formed with the second connecting lines 220b1 by being patterned in the second direction. The first sensing cells 220a may be patterned to respectively independent patterns between the second sensing cells 220b, and may be connected along the first direction by the first connecting lines 220a1 positioned above or below the first sensing patterns 220a. In this case, the first connecting lines 220a1 may be electrically connected to the first sensing cells 220a by being directly contacted with the first sensing cells 220a above or below the first sensing cells 220a. Alternatively, the first connecting lines 220a1 may be electrically connected to the first sensing cells 220a through contact holes, etc.

The first connecting lines 220a1 may be formed using a transparent conductive material, e.g., ITO, or using an opaque low-resistance metal material. The first connecting lines 220a1 may be formed by adjusting their width, etc. so that the visibility of the patterns is prevented.

The sensing lines 230 are electrically connected to row lines of the first sensing cells 220a and column lines of the second sensing cells 220b, respectively, so as to connect the row and column lines to an external touch IC (not shown), e.g., a position detecting circuit through a first bonding pad portion 20a. The sensing lines 230 are arranged on the non-display area 510 positioned on the outside of the display area 500 on which an image is displayed. The material of the sensing lines 230 may include any suitable material. For example, the sensing lines 230 may be formed of a transparent electrode material used to form the sensing patterns 220 or of a low-resistance metallic material, e.g., molybdenum (Mo), silver (Ag), titanium (Ti), copper (Cu), aluminum (Al) and/or Mo/Al/Mo.

The touch screen panel described above is a capacitive touch screen panel. If a user's finger contacts the touch screen panel, a change in capacitance caused by the contact at the contact position is transferred from the sensing patterns 220 to the touch IC (not shown) via the sensing lines 230 and the first and second touch pad portions. Then, the change in capacitance is converted into an electrical signal by X and Y input processing circuits (not shown) in the touch IC, thereby detecting the contact position.

FIG. 6 is a sectional view taken along line II-II' of an upper substrate shown in FIG. 1. Referring to FIG. 6, the sensing patterns 220 formed on the display area 500 of the upper substrate 200 include the first sensing cells 220a formed to be connected in each row line along the first direction, the first connecting lines 220a1 connecting the first sensing cells 220a along the first direction, the second sensing cells 220b formed to be connected in each column line along the second direction, and the second connecting lines 220b1 connecting the second sensing cells 220b along the second direction. An insulation layer 240 is interposed between the first and second connection lines 220a1 and 220b1 intersecting each other.

As shown in FIG. 6, a black matrix 210 is formed on the non-display area 510 of the upper substrate 200 positioned at the outside of the display area 500. The sensing lines 230 electrically connected to the sensing patterns 220 are formed on the non-display area 510 overlapping with the black matrix 210. The sealing material 400 for bonding the upper and lower substrates 200 and 100 is also formed on the non-display area 510. In this case, the black matrix 210 performs a function of forming a frame around the display area 500, while preventing the patterns, e.g., the sensing lines 230 formed on the non-display area 510, from being visible.

Only the lower substrate 100 bonded to the upper substrate 200 is illustrated in FIG. 6 for convenience of illustration. That is, the plurality of pixels 112 are formed on the lower substrate 100, and the pressure sensor portion 600 is formed between the pixels 112 and the lower substrate 100.

By way of summary and review, according to example embodiments, a flexible display device includes a pressure sensor portion between the substrate and the pixels, so a touch position on the touch screen panel is detected through pressure. Accordingly, it is possible to minimize the thickness of the display device and to perform touch recognition even when an object other than skin of a finger contacts the touch screen panel.

Further, at least one electrode of the pressure sensor portion is implemented as a strain pattern, so that it is possible to sense a bending state of the flexible display device. Further, the pressure sensor portion and the display device are connected to one flexible printed circuit board, so that it is possible to simplify a manufacturing process of the display device and to reduce production cost. Further, an upper substrate of the display device is used as a substrate of a touch screen panel, so that it is possible to improve visibility of images while minimizing the thickness of the display device, and to perform more detailed touch recognition.

In contrast, a conventional touch screen panel is generally configured to be attached to an outer surface of a display device, e.g., a liquid crystal display device or an organic light emitting display device. For example, the conventional touch screen panel and display device may be manufactured separately, followed by attachment of the touch screen panel to the display device. However, when the touch screen panel and display device are manufactured separately, the entire thickness of a resultant product may be increased, as well as the manufacturing costs. Further, the visibility of an image may be deteriorated due to a gap existing between the touch screen panel and the display panel.

In addition, a conventional capacitive touch screen panel senses a change in capacitance caused by contact with the skin of a finger. However, when a touch is performed with a hand wearing a glove or using a non-conducting pen with a sharp end, the touch may not be recognized.

Also, a flexible display device requires a touch screen panel that exhibits flexibility. However, as sensing electrodes and the like of the conventional touch screen panel are formed on a glass substrate, the glass substrate may increase overall thickness, e.g., as glass requires a predetermined thickness to allow processing, and decrease flexibility.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A flexible display device having a touch and bending sensing function, comprising:
   a plurality of pixels on a display area of a first substrate;
   signal lines arranged on a non-display area of the first substrate positioned outside the display area of the first substrate, the signal lines being connected to the plurality of pixels;
   a pressure sensor portion between an upper surface of the first substrate and a lower surface of the plurality of pixels;
   a second substrate positioned on the first substrate so as to seal the first substrate, the plurality of pixels and the pressure sensor portion being between the upper surface of the first substrate and the second substrate, and the second substrate being divided into a display area and a non-display area positioned outside of the display area;
   a plurality of sensing patterns on the display area of the second substrate;
   a plurality of sensing lines on the non-display area of the second substrate and connected to the respective sensing patterns; and
   a sealing material at an edge of the non-display area of the second substrate, the sealing material being in direct contact with the second substrate and the upper surface of the first substrate so as to bond together the first and second substrates.

2. The flexible display device of claim 1, further comprising a first touch pad portion provided on the non-display area of the second substrate overlapping with the sealing material, the first touch pad portion being electrically connected to the plurality of sensing lines.

3. The flexible display device of claim 2, further comprising:
   a driving pad portion at one end of the non-display area of the first substrate, the driving pad portion being electrically connected to the signal lines;
   a pressure sensor pad portion adjacent to and on a same plane as the driving pad portion, the pressure sensor pad portion being electrically connected to the pressure sensor portion; and
   a second touch pad portion adjacent to and on a same plane as the driving pad portion, the second touch pad portion being electrically connected to the first touch pad portion.

4. The flexible display device of claim 3, wherein a plurality of pads constituting the first touch pad portion are electrically connected to pads of the second touch pad portion through a plurality of conductive media in the sealing material.

5. The flexible display device of claim 3, wherein the driving pad portion, the pressure sensor pad portion, and the second touch pad portion are electrically connected to a same flexible printed circuit board.

6. The flexible display device of claim 1, wherein the pressure sensor portion comprises:
   a plurality of first electrodes arranged in a first direction on the upper surface of the first substrate;
   an insulation layer on the entire surface of the first substrate and on the first electrodes;
   a plurality of second electrodes on the insulating layer, the second electrodes being arranged in a second direction intersecting the first electrodes; and
   a buffer layer on the second electrodes, the buffer layer to planarize the upper surface of the first substrate, and the first electrodes, the insulating layer, the second electrodes, and the buffer layer being sequentially stacked directly on the upper surface of the first substrate in the stated order.

7. The flexible display device of claim 6, wherein the pressure sensor portion further comprises spacers in the insulation layer, the spacers to maintain an interval between the first and second electrodes.

8. The flexible display device of claim 6, wherein the insulating layer includes a pressure conductivity changeable material.

9. The flexible display device of claim 6, wherein the plurality of pixels are directly on the buffer layer.

10. The flexible display device of claim 1, wherein the first substrate includes a transparent material exhibiting flexibility.

11. The flexible display device of claim 10, wherein the first substrate includes polyimide.

12. The flexible display device of claim 1, wherein the plurality of sensing patterns are between a lower surface of the second substrate and the plurality of pixels.

13. The flexible display device of claim 12, wherein the plurality of sensing patterns are directly on the lower surface of the second substrate and are spaced apart from the plurality of pixels.

14. The flexible display device of claim 1, wherein the pressure sensor is directly between the lower surface of the second substrate and the plurality of pixels.

* * * * *